United States Patent [19]
Fujii et al.

[11] Patent Number: 5,840,226
[45] Date of Patent: Nov. 24, 1998

[54] MANUFACTURING METHOD FOR A CONSTRUCTION MATERIAL MADE OF WOODY MATERIAL AND MORTAR

[75] Inventors: Tsuyoshi Fujii; Atsushi Miyatake, both of Ibaragi-ken, Japan

[73] Assignee: The Forestry and Forest Products Research Institute, Ibaragi-ken, Japan

[21] Appl. No.: 831,785

[22] Filed: Apr. 9, 1997

Related U.S. Application Data

[62] Division of Ser. No. 623,213, Mar. 28, 1996, Pat. No. 5,741,589.

[51] Int. Cl.$^6$ .................................................... B28B 1/08
[52] U.S. Cl. .............................. 264/71; 264/113; 264/333
[58] Field of Search ................................ 264/71, 333, 113

[56] References Cited

U.S. PATENT DOCUMENTS

| | | |
|---|---|---|
| 1,329,292 | 1/1920 | Christin . |
| 1,420,220 | 6/1922 | Roux . |
| 3,289,371 | 12/1966 | Pearson et al. . |
| 3,400,507 | 9/1968 | MacChesney . |
| 3,819,466 | 6/1974 | Winfield et al. . |
| 3,857,217 | 12/1974 | Reps . |
| 4,144,685 | 3/1979 | Fox . |
| 4,402,890 | 9/1983 | Offenhausen ............................ 264/113 |
| 4,799,961 | 1/1989 | Friberg . |
| 5,021,093 | 6/1991 | Beshay . |
| 5,047,086 | 9/1991 | Hayakawa et al. . |
| 5,167,710 | 12/1992 | Leroux et al. . |
| 5,188,889 | 2/1993 | Nagatomi ................................. 264/257 |
| 5,196,061 | 3/1993 | Thomas et al. . |
| 5,324,469 | 6/1994 | Walter ........................................ 264/71 |
| 5,397,067 | 3/1995 | Akiyama et al. . |
| 5,415,821 | 5/1995 | Irie .......................................... 264/113 |
| 5,505,238 | 4/1996 | Fujii ........................................ 144/2 R |

FOREIGN PATENT DOCUMENTS 22510020  6/1992  United Kingdom .

*Primary Examiner*—James Derrington
*Attorney, Agent, or Firm*—Barry R. Lipsitz; Ralph F. Hoppin

[57] ABSTRACT

A woody group material and cement are combined to form a construction material. The material has an aggregate of finely split pieces formed by splitting wood, bamboo or the like in a fiber direction. The split pieces are formed in one or more layers and are surrounded by, and buried in, a mortar. A construction material can be provided which is fire resistant and has a strength comparable to a lumbered product such as wood material obtained by cutting raw wood. The finely split pieces of wood, bamboo or the like are very strong and tough because they closely adhere to the mortar. Moreover, it is possible to use a fiber structure of raw material. Since the finely split pieces can use a small diameter wood, lumbering byproducts, and other waste material, it is possible to achieve effective use of forest resources and low manufacturing costs. Further, the product can realize various strength and fire resistance properties for applications as a wall material or other structural material by changing the sort of finely split pieces, shape and size, and mortar ratio. The product can therefore be tailored to meet various construction needs.

4 Claims, 9 Drawing Sheets

F I G. 8
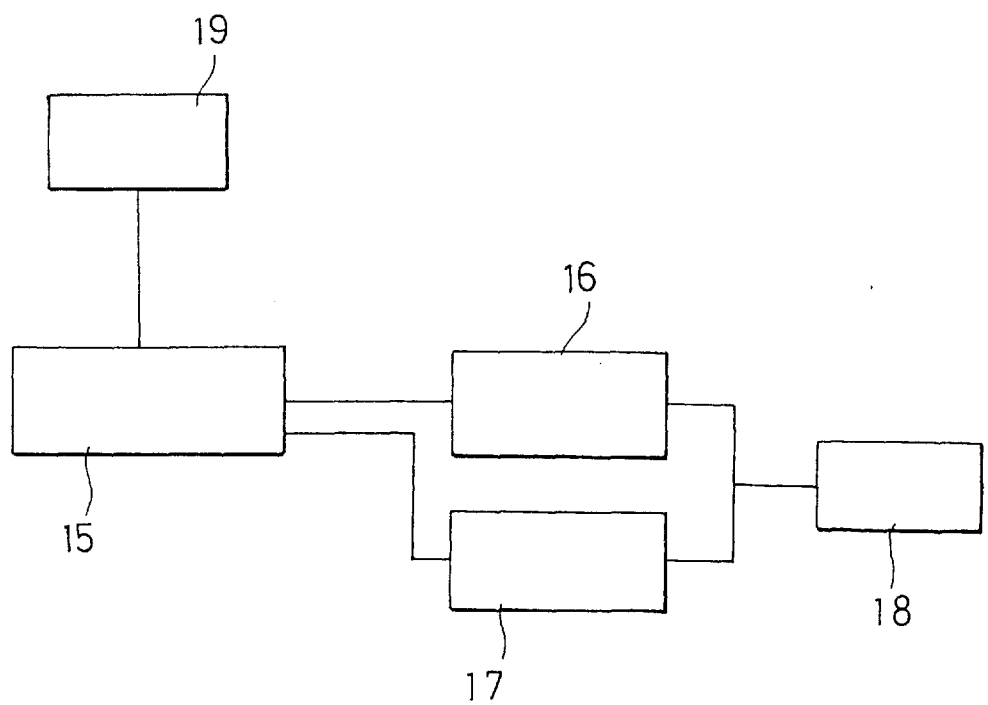

MANUFACTURING METHOD FOR A CONSTRUCTION MATERIAL MADE OF WOODY MATERIAL AND MORTAR

This application is a divisional of commonly assigned, U.S patent application Ser. No. 08/623,213, filed Mar. 28, 1996, now U.S. Pat. No. 5,741,589.

BACKGROUND OF THE INVENTION

The present invention relates to a construction material, manufacturing method and apparatus thereof made by solidifying an aggregate formed by fine pieces of woody material such as wood, bamboo or reed split to a fiber direction and by mortar.

As it is well known, wood has been widely used from old days since it had an advantage that it is easy to get and easy to process as well as reproduction is possible. However, in concomitant with an increase of the world population and improvement of life level, a usage amount of wood is remarkably increased, and a requirement for woody material is also made to be high and various. To this end, in addition to a conventional product, woody group raw materials such as aggregate material, single board piled material LVL plywood, particle board, fiber board, wood piece cement board, and wood fluff cement board as described above is developed.

The so-called product having been used from old days was made from a log having a diameter more than ordinarily 100 mm, a yield from the stem portion of a standing tree decreases to 50–80%, and a yield from the whole of the standing tree including branch portions to 30–50%. And, the lumbered product may include joints in many cases, but such a lumbered product having the joints is decreased to 40–60% in strength relative to the strength (a strength peculiar to wood) of the lumbered product having no joint.

The aggregate material has been offered to solve a problem of strength decrease due to the joint possessed by many lumbered product, and its strength is improved to about 60–75% of a strength peculiar to wood. However, many parts of the wood are spent out in a cutting process for obtaining a plate material as a raw material of the aggregate material, and the yield from the stem portion of the standing tree is decreased to about 30–40%.

The single board piled material LVL is one that a single board is made by peeling off the log and then cutting to a predetermined size form so as to arrange the wood grain to the same direction whereby piling by an adhesive agent occurs. And, the plywood is one that aforesaid single boards are made to be crossed alternately and piled by an adhesive agent.

By the way, since the manufacturing of such a single board is carried out likely by thinly peeling out from a log by an apparatus such as rotary lathe without being cut by a saw, there is no generation of so-called sawdust. Accordingly, a yield from the stem portion of the standing tree is improved to 60–70%, and one which is the same degree with aforesaid aggregate material in strength also can be obtained.

However, since the single board is manufactured by turning the log, the log capable of utilization as a raw material is limited to one having a large diameter.

The particle board is one that a wood particle manufactured by using various kinds of crushing devices is applied with an adhesive agent so as to be molded and solidified to a plate form. Since a greater part of wood material can be made in to a product, the yield from the raw wood comes to 90%.

But, since the lengths of small wood pieces are less than 50 mm and besides it is difficult to mold by arranging the wood grain, only a strength of $2/3$–$1/2$ is obtained relative to the lumbered wood product, and a Young's coefficient is also about $1/2$ of the lumbered wood product.

The fiber board is one where a tip crushes wood to a fiber state by a fiber dissolving device, and these fibers are bundled then molded and solidified by adhesive agent. The yield from the raw wood comes to 90%, but its strength is equal or about $1/3$ relative to the lumbered wood product although it depends on the conditions, and a Young's coefficient is about $1/3$ of the lumbered wood product.

The aforementioned lumbered wood product, aggregate, and single layer piled material LVL are mainly used as a structural material and an interior or exterior finishing material of house, and the plywood, particle board and fiber board are mainly used as a basic material.

However, for these woody group construction materials, in addition to the aforementioned problems, the following disadvantages are included.

That is, they include inevitable problems such as flammability, so in case of fire, they would be burnt out. To this end, in many cases, its use at populous areas is limited.

Those which are developed for solving such a disadvantage and also improving a yield from the raw material, are a wood piece cement board and a wood fluff cement board.

The wood board cement board is one where a wood waste pieces produced by a planer process, equal amount of cement and water are mixed then pressed and molded.

And, the wood fluff cement board is one that a log having a diameter of 10–30 cm is cut out to a helical state of wood fluff of 30–50 cm length, 3–5 mm width, and 0.3–0.5 thickness by using a wood fluffing device, and these wood fluffs are solidified and molded by mixing and stirring with cement and water.

The wood piece cement board and the wood fluff cement board both have fire resistivity and a yield from the raw material is also high, but they have problems in their strengths. A strength of the former is $1/5$ of the strength of the lumbered wood product, and similarly the latter has $1/10$ of the strength of the lumbered wood product.

As described above, a wood material or aforementioned construction material utilized with wood material has problems including lack of fire resistivity, lack in strength relative to conventional lumbered wood product, low in yield from the wood material being a raw material, and the need for a raw wood of large diameter as a raw material.

SUMMARY OF THE INVENTION

The present invention is directed to solve the aforementioned problems.

The woody strand cement board in accordance with the present invention is made such that a finely split pieces aggregate is formed which becomes a bone structure of cement board by adhering single layers made by arranging in parallel the finely split pieces formed by splitting a wood, bamboo, reed or other raw material to a direction parallel to fibers to its lengthwise, to a horizontal direction and vertical direction in multiple, and this finely split pieces aggregate is solidified and molded by cement, sand and water at a pressed state.

In the above described woody strand cement board, an adhered portion of horizontal direction of the above mentioned each single layer is provided to a position which does not superpose in a piling direction of the single layer.

And, a manufacturing method of the woody strand cement board in accordance with the present invention comprises:

(a) a process for cutting a woody material such as wood, bamboo, and reed to a predetermined length (b) a process for obtaining a split piece by splitting the woody material which is cut to a predetermined length along the fiber direction, (c) a process for obtaining a finely split pieces by further finely splitting the split piece obtained at the aforesaid process, (d) a process for pouring in a mortar to a single layer formed by spreading the finely split pieces side by side within a molding frame, (e) a process for repeating in turn the aforesaid process (d), piling the single layers into the mold frame in multiple stages, covering each finely split piece with mortar, and obtaining a finely split pieces aggregate of a state where a mortar is filled to gaps defined with each finely split piece, (f) a process for vibrating by laying an upper lid plate on a top surface of the finely split pieces aggregate obtained at the aforesaid process (e), and debubbling and at the same time closely contacting the finely split piece and the mortar, and subsequently (g) a process for applying a pressure to the upper lid plate, and pressing and tightening until the mortar reaches a semi-hardened state, and (h) a process for releasing the pressed tightening and then preserving until the mortar reaches a predetermined hardness.

In above manufacturing method, it is possible to spread a mixture of cement and sand to a single layer spread with water instead of mortar.

Further, a manufacturing apparatus of the present invention comprises:

finely split pieces forming means for splitting a woody material such as wood, bamboo or reed in a direction parallel to the fiber, means for molding and solidifying by pouring a mortar by piling the layers formed by spreading the aforesaid finely split pieces, first means for forming the single layers by feeding the finely split pieces from the aforesaid finely split piece forming means to the aforesaid molding and solidifying means, second means for forming the single layer by spreading the finely split pieces in a direction crossing with the finely split piece of single layer formed by the aforesaid first means, and means for vibrating and pressing the finely split piece in the aforesaid molding and solidifying means and the mortar poured thereto.

BRIEF DESCRIPTION OF THE DRAWINGS

FIG. 8 is a block diagram showing a configuration of an essential part of the manufacturing apparatus.

DETAILED DESCRIPTION OF THE INVENTION

Hereinafter, a preferred embodiment of the present invention will be described more in detail with reference to the accompanying drawings. In this embodiment, willow, large bamboo, hemp, waste material of house are used as a raw material, and the woody strand cement board is manufactured by each raw material independently, but it is a matter of course that it is good to mix these raw materials.

Figure 1:
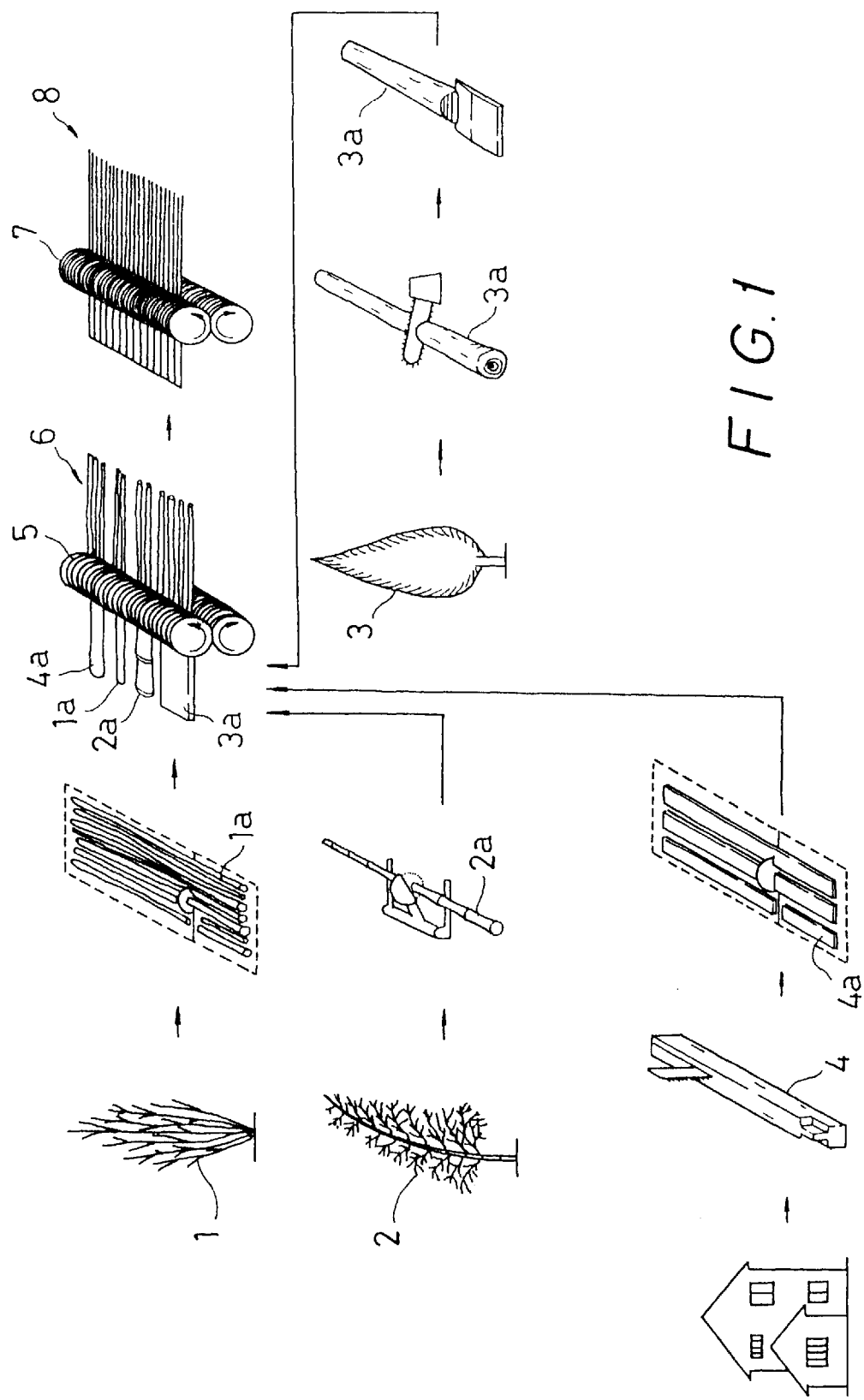
FIG. 1 is a schematic diagram for illustrating a manufacturing process of a finely split piece.

In FIG. 1, reference numeral 1 is a small diametral wood (20–50 mm diameter) of willow, numeral 2 is a large bamboo of 20–100 mm in diameter, numeral 3 is a hemp, numeral 4 is a waste material produced by dismantling a house and the like, and the large bamboo 1 and willow 2 are obtained as a predetermined size material 1a, 2a respectively by cutting to a length of 600 mm' by a rotary saw. And, the hemp 3 and the waste material 4 are cut to a length of 600 mm and then further cut to a board of 25 mm thickness whereby predetermined size materials 3a, 4a are obtained. Successively, respective predetermined size materials according to the aforesaid raw material is split by a splitting device 5 whereby a split piece 6 of 10 mm in thickness is made. The split piece 6 obtained thereby is further finely split by a finely splitting device 7 to form finely split pieces 8 of 4 mm×10 mm in section. Further, here the raw material less than 600 mm is also used by splitting. And, the finely split piece 8 is manufactured by utilizing an apparatus of U.S. Pat. No. 5,505,238, issued Apr. 9, 1996.

Figure 2A:
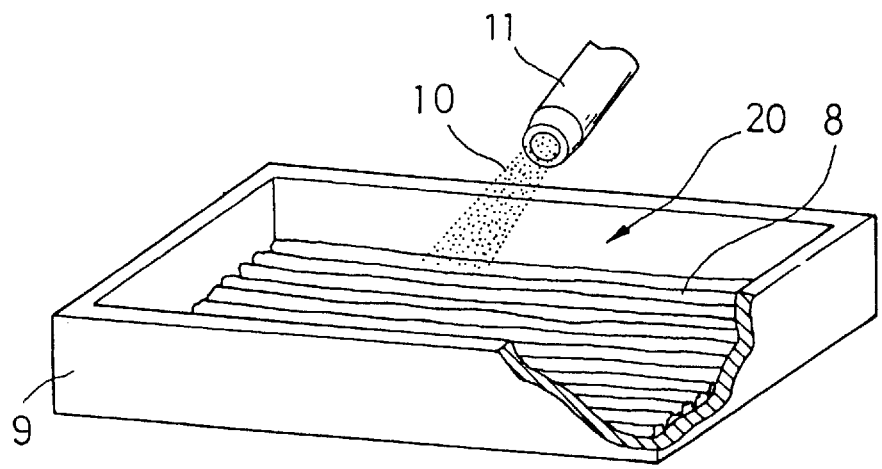
FIGS. 2(a) and 2(b) are perspective views for illustrating a piling process of the finely split pieces and mortar.
Figure 2A:
Figure 2B:
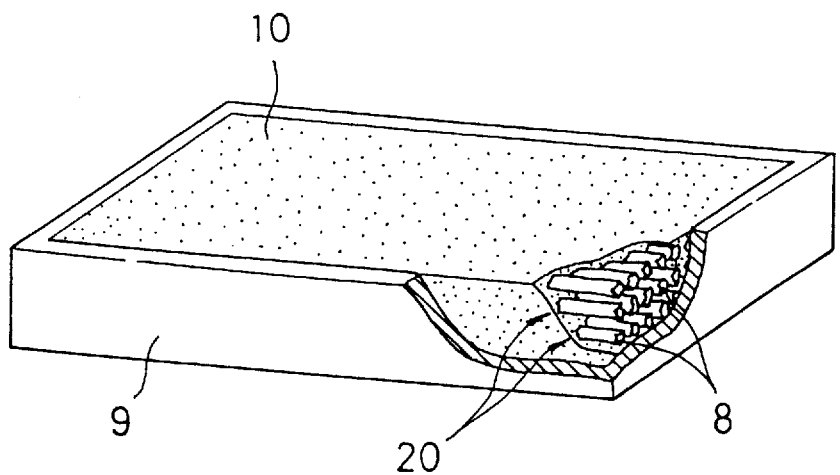

In FIG. 2, frame 9 is sized to 600 mm×300 mm crosswise and lengthwise and it is a molding frame of steel made having a predetermined depth, and a single layer is formed by spreading the finely split pieces 8 obtained at the aforesaid process to the bottom of this molding frame 9 by arranging them in the fiber directions. Successively, mortar 10 sent from a mortar tank, not shown, is jetted from a nozzle 11 and spread to the whole of the single layer.

The composition of the mortar spread to the single layer 81 is based on a cement 1, sand 1, water 0.5 (weight ratio), but the water quantity is controlled in response to a moisture containing rate of the finely split piece 8. Further, the spread amount of the mortar is the same as the volume of the single layer.

Figure 3A:
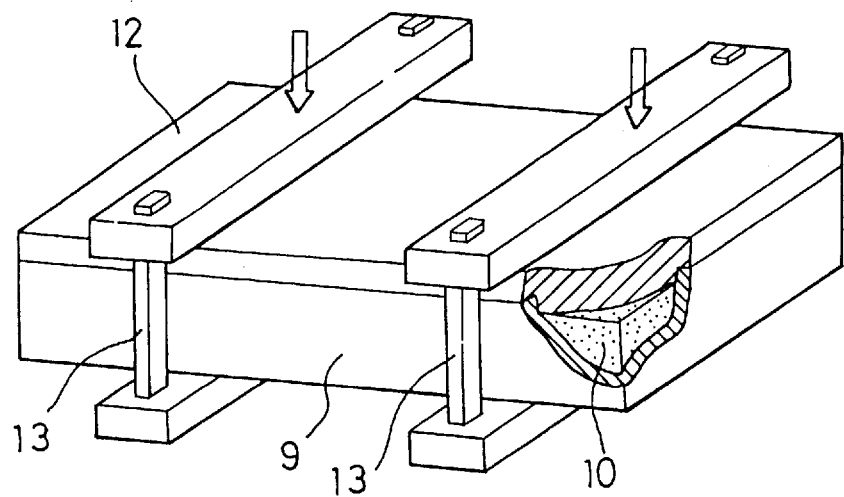
FIGS. 3(a) and 3(b) are perspective views for illustrating a pressing and drying process.
Figure 3B:
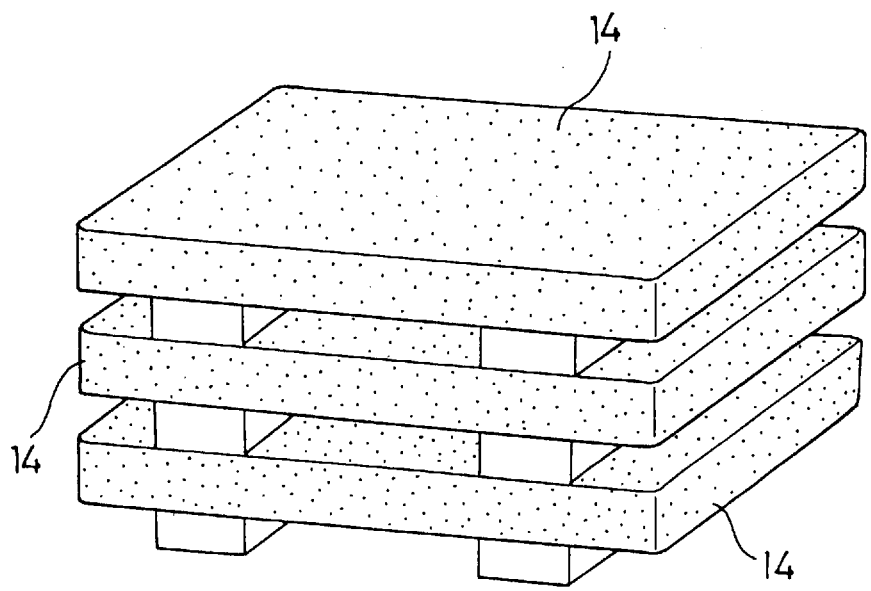

Further, in case a tree bringing an obstacle to a hardening of cement such as hemp is used for a raw material of the finely split pieces 8, calcium chloride and the like is added to the mortar (about 1% of cement weight) By repeating in turn the spreading of the mortar and a formation of a single layer, a single layer spread with mortar is piled up to become a predetermined thickness in the molding frame 9 (FIG. 2(*b*)). Further, the mortar is added as required, and it is made to sufficiently cover each single layer of piled state with the mortar. At a time point that the piled layers are completed by doing this, as shown in FIG. 3(*a*), a pressing and tightening plate 12 is set to the molding frame 9. Successively, a vibration is applied to the molding frame 9 by a vibration applying machine which is not shown. By this vibration, a bubble occurring at the mortar interior, or gap between the mortar and the finely split piece is eliminated, and a close contact of the mortar 10 and the finely split piece 8 is properly obtained.

Next, pressure is applied to the mortar within the molding frame 9 and to the finely split piece 8 as shown by the arrows in FIG. 3(*a*). This pressure application is done by a pressure applying means, not shown, via the pressing and tightening plate 12, but in this embodiment, a pressure of 5–10 kgf/cm is applied. The applied pressure is held for two days by a clamp 13, and then the pressure is released. At this time, a woody strand cement board in which the mortar is still in a semi-hardened state is obtained.

And, as shown in FIG. 3(*b*), the aforesaid woody strand cement board 14 is naturally dried in the atmosphere for about one month until the mortar is completely hardened. Thus, a woody strand cement board can be obtained in which the mortar has completely hardened and has a predetermined strength.

Next, other embodiments will be described in response to the requirement in reference to FIGS. 1, 2 and 3. In the aforementioned embodiment, the coupling of the finely split pieces to each other, structuring the single layers as well as the single layers to each other, is executed by spreading the mortar and hardening thereof, but in the following embodiment, instead of spreading the mortar, cement and sand are spread.

First, according to a process shown in FIG. 1, a finely split piece having a size of 4 mm×10mm insection and approximately 60 mm in length is manufactured. These finely split pieces are spread at the bottom portion of the molding frame 9 in a direction parallel to the fiber thereby forming a single layer (FIG. 2(*a*)), and an adequate amount of water is spread thereto. The aforementioned water spreading is not required when a tree or bamboo and the like with more than 100% of moisture content rate is used for the raw material of finely split pieces. Further, in case of requiring the water spreading, about ½ of cement weight is an adequate quantity for a water spreading amount.

Subsequently, a mixture of cement and sand is spread on said single layer from a nozzle 11. The mixing rate of cement and sand is 1 of cement and 10.5 of sand (weight ratio), and the spreading quantity to a single layer is ½–⅔ of volume of the single layer.

And, in case hemp and the like is used for a raw material of the finely split pieces, since an obstacle to the hardening of the cement is encountered, calcium chloride should be added to the water or cement to be spread.

As described above, single layers are piled until a predetermined thickness is reached by repeating a formation of single layers, water spreading, and a spreading of a mixture of cement and sand, within the molding frame 9. Successively, as shown in FIG. 3(*a*), the pressing and tightening plate 12 is set on the top surface of the molding frame 9 and applying a pressure (10–20 kgf/cm²), and this pressure is maintained for about 2 days to one week by a clamp 13. When this process is finished, a woody strand cement board of a state that the cement is half hardened is obtained. After the woody strand cement board of a state that the cement is half hardened is made, this is naturally dried for about two weeks in the atmosphere, it is set within the molding frame 9 spread with mortar at bottom, and further mortar is spread from the top thus forming a mortar layer on the whole surface of the cement board. The composition of the mortar is cement 1, sand 1, water 0.5 (weight ratio), and an amount of mortar used is ½–⅓ of total quantity of the finely split pieces (volume ratio).

Subsequently, pressure (10–20 kgf/cm²) is applied via the pressing and tightening plate, and this pressure is maintained for 2 days—one week by a clamp, and then naturally dried for about one month, and thereby a woody strand cement board as a completed product is obtained.

By the way, in each aforementioned embodiment, each single layer has a case to pile so as to cross the fiber direction of the finely split pieces. By piling the single layers thusly, a product having more strength can be obtained. And, when the length of each finely split piece is short, the single layer is formed by spreading in random with ignoring the fiber directions. And, it is also good if a single layer formed by arranging a fiber direction of the finely split pieces and a single layer spread the finely split pieces in random are alternately piled. And, in the aforementioned embodiment, since the length of a single layer is 600 mm being the same as the molding frame, it will be good if piling one single layer. However, in order to manufacture a product having a length more than this, it is required to pile by joining the single layers lengthwise. In this case, when it is made so as to make said joining portion not to be matched each other in a piling direction, a product having a high strength can be obtained.

Figure 4A:
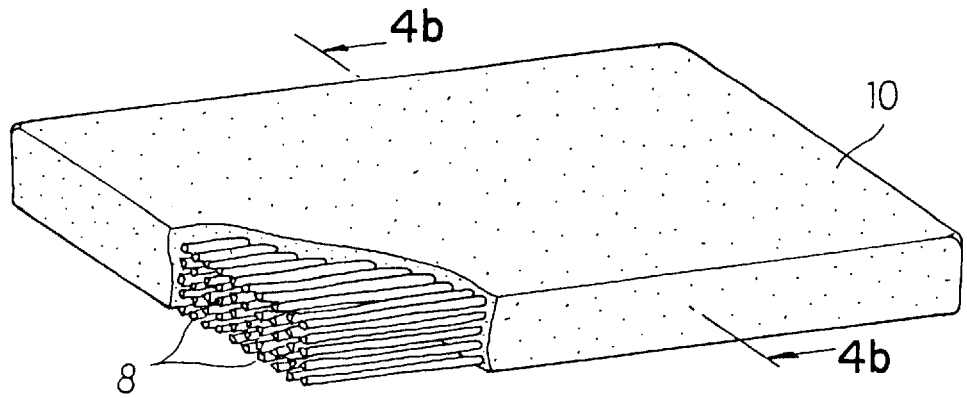
FIG. 4(a) is a perspective view showing a first embodiment of woody strand cement board, and (b) is a cross sectional view taken along b—b of (a)
Figure 4B:
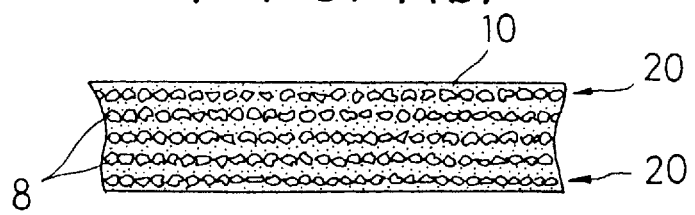

FIGS. 4–7 are views showing the embodiments of the woody strand cement board of the present invention. FIG. 4 is a view showing a woody strand cement board made by solidifying and molding the finely split pieces aggregately piled by arranging the finely split pieces 8 in parallel to a fiber direction by a mortar 10. The finely split pieces aggregate making a bone of this cement board is formed by piling in multiple stages the single layers 20 formed by arranging in parallel the finely split pieces 8 together with the mortar. Accordingly, as shown in sectional view, each finely split piece 8 is made to a state buried into the mortar 10.

Figure 5A:
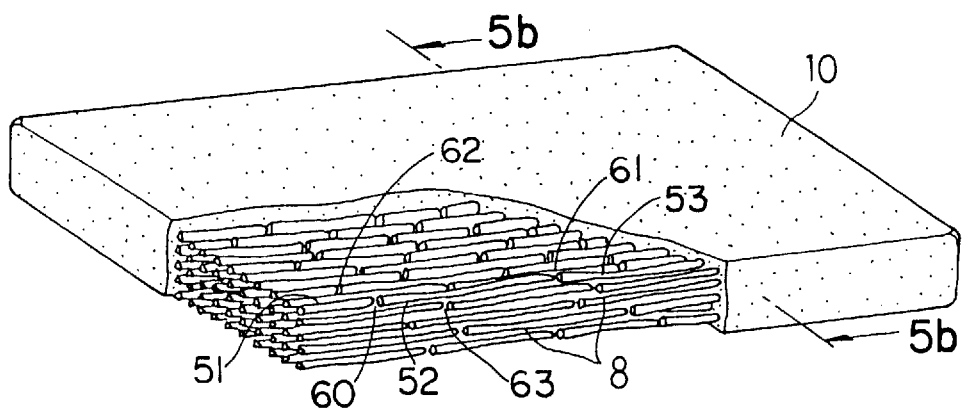
FIG. 5(a) is a perspective view showing a second embodiment of a woody strand cement board, and (b) is a cross sectional view taken along line b—b of (a)
Figure 5B:
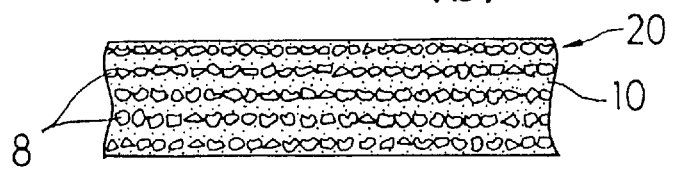

FIG. 5 is a view having a structure same as the woody strand cement board shown in FIG. 4, but short sized finely split pieces 8 are used.

Figure 6A:
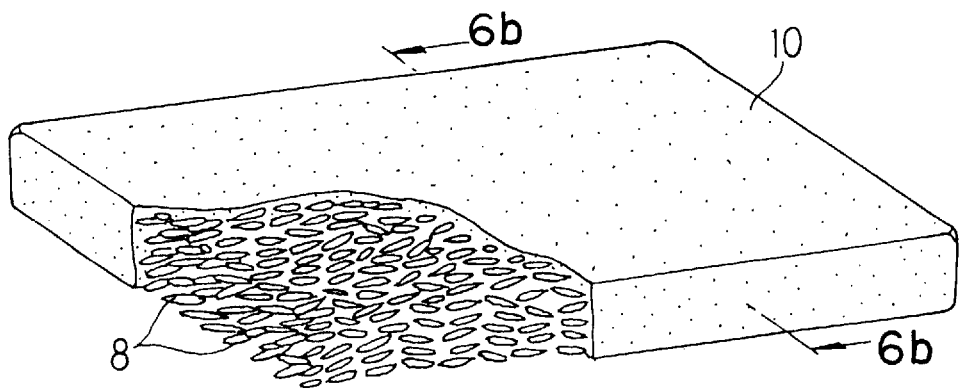
FIG. 6(a) is a perspective view showing a third embodiment of a woody strand cement board, and (b) is a cross sectional view taken along line b—b of (a)
Figure 6B:
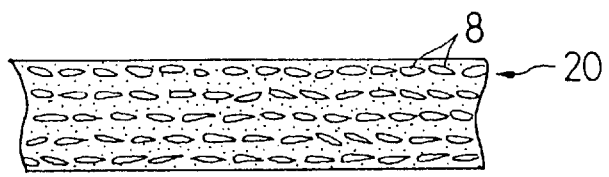

FIG. 6 shows a woody strand cement board formed by piling in random short sized finely split pieces 8 together with the mortar 10. In this case as well, a cement board of predetermined thickness is formed by piling the single layers 20 spread in random the short sized finely split pieces 8 together with the mortar 10.

Figure 7A:
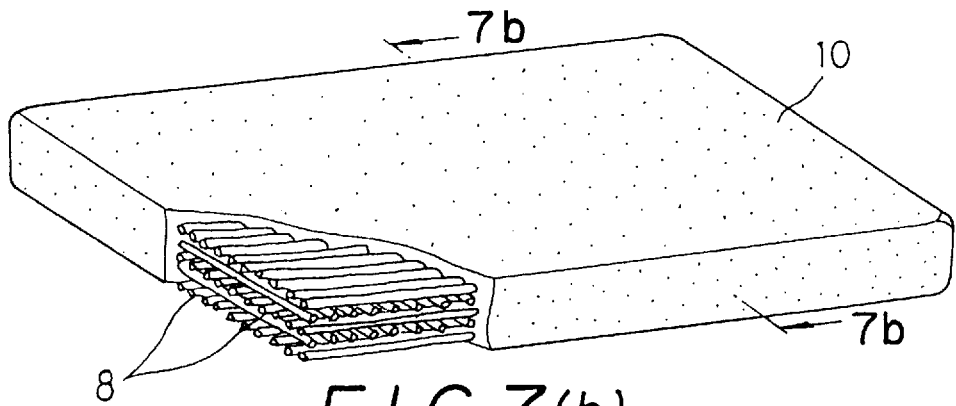
FIG. 7(a) is a perspective view showing a fourth embodiment of a woody strand cement board, and (b) is a cross sectional view taken along line b—b of (a)
Figure 7B:
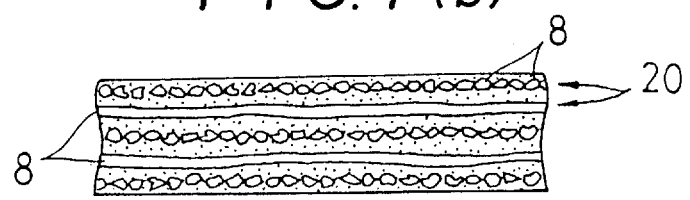

FIG. 7 shows a cement board formed so as to cross the fiber directions of the finely split pieces 8 of each single layers 20 piled.

Since the woody strand cement boards shown in FIGS. 4–7 are manufactured by the aforementioned method, the whole surface is covered by a mortar, but in order to obtain further more fire resistivity, it is preferred to form a mortar layer to a predetermined thickness further to its whole surface.

Following table 1 shows results of performance test of aforementioned woody strand cement board.

TABLE 1

| Sample No. | Wood finely split piece Length | Wood finely split piece Mode of Arrangement | Weight ratio (manufactured time) cement/sand | Weight ratio (manufactured time) mortar/wood finely split piece | Applied pressure (kgf/m²) | Product according to the present invention thickness (mm) | Product according to the present invention specific weight | Strength test Young's coefficient (10³ kgf/cm³) | Strength test bending strength (kgf/cm²) | Heating test carbonizing (%) | Heating test carbonizing (mm/m) |
|---|---|---|---|---|---|---|---|---|---|---|---|
| 1 | 600 | parallel | 1:0 | 13.3 | 5 | 25 | 1.33 | 74 | 265 | | |
| 2 | 600 | parallel | 1:0.5 | 9.2 | 5 | 24 | 1.24 | 73 | 268 | | |
| 3 | 600 | parallel | 1:0.5 | 12.1 | 5 | 30 | 1.40 | 82 | 225 | 40 | 0.40 |
| 4 | 600 | parallel | 1:0.5 | 17.5 | 5 | 39 | 1.54 | 52 | 197 | 26 | 0.36 |
| 5 | 600 | parallel | 1:1 | 11.5 | 5 | 30 | 1.37 | 66 | 214 | 50 | 0.48 |
| 6 | 150 | parallel | 1:0 | 11.4 | 5 | 25 | 1.35 | 24 | 97 | | |
| 7 | 150 | parallel | 1:0.5 | 20.2 | 5 | 34 | 1.60 | 62 | 79 | 27 | 0.32 |
| 8 | 150 | random | 1:0 | 7.5 | 5 | 28 | 0.80 | 36 | 25 | | |
| 9 | 150 | random | 1:0.5 | 20.2 | 5 | 35 | 1.59 | 97 | 51 | 39 | 0.42 |
| 10 | 150 | random | 1:1 | 16.7 | 5 | 35 | 1.60 | 98 | 57 | 38 | 0.42 |

The raw material of finely split piece used for aforementioned performance test was a hemp (moisture content rate 12.5%), and for the finely split pieces, two kinds of those were used which was 4 mm in thickness, 10 mm in width, 600 mm in length, and 4 mm in thickness, 10 mm in width, 150 mm in length. For the strength test, a bending test by means of centrally concentrating load system of 45 mm span was executed, and thereby a bending Young's coefficient and a bending strength values were obtained. In accordance with these test results, in case when the finely split pieces of 600 mm in length were piled to a fiber direction, in response to the ratio of cement: sand becoming to be lower, the value of the bending Young's coefficient and the bending strength become smaller, and in response to the ratio of mortar finely split piece becoming to be higher, the strength becomes decreased. However, as it will be clear from the result of sample No.1–4 of table 1, its strength of any of them comes to 60–75% of the lumbered product, and its strength comes to 2.5–4 times when comparing to a conventional wood piece cement board.

Further, in case of using a finely split piece of 150 mm in length, the bending strength was remarkably decreased even if each finely split piece was spread in parallel to a fiber direction. Further, in case of piling such a short finely splited pieces were piled in random, its strength was more decreased.

According to the heating test, those which gives an influence to a carbonizing rate and a carbonizing speed were the rate of the finely split piece and the mortar, and a thickness of sample itself. That is, the higher the rate of the mortar, the smaller the carbonizing rate, and the carbonizing speed also becomes slower. For instance, the carbonizing speed of sample No.3 and 4 is less than ½ than that of the wood.

FIGS. 8–12 are views showing the embodiments of the manufacturing apparatus. FIG. 8 is a view showing a basic structure of the manufacturing apparatus, and as shown therein, this manufacturing apparatus comprises a mold solidifying means 15, a first means 16, a second means 17, a finely split pieces molding device 18, and a mortar feeding means 19 and etc. In this embodiment, the mold solidifying means 15 includes a shown mold frame 9, not shown vibrating machine, and a pressure applying device etc. In this mold solidifying means 15, the single layers structured by the finely split pieces are piled together with the mortar, and a vibration is applied and then pressed.

The first means 16 and the second means 17 are devices for forming the single layer by feeding the finely split pieces to the mold frame 9 of the mold solidifying means 15, and respectively includes a plurality of transferring means.

The finely split piece forming device 18 is a device for manufacturing the finely split pieces by splitting the raw material of tree and bamboo etc., and in this embodiment, a device of aforementioned U.S.Pat. No. 5,505,238 is used. The mortar feeding means 19 includes a mortar tank, a feeding hose, and a nozzle etc., and the mortar is spread to the single layer of the finely split piece formed to the mold frame 9.

The finely split pieces manufactured at the finely split pieces forming device 18 are transferred to the mold solidifying device 18 by the first means 16 and the second means 17 whereby forming the single layer, and piled together with the mortar. And, a predetermined woody strand cement board is completed via the processes of pressure applying and drying.

Figure 9:
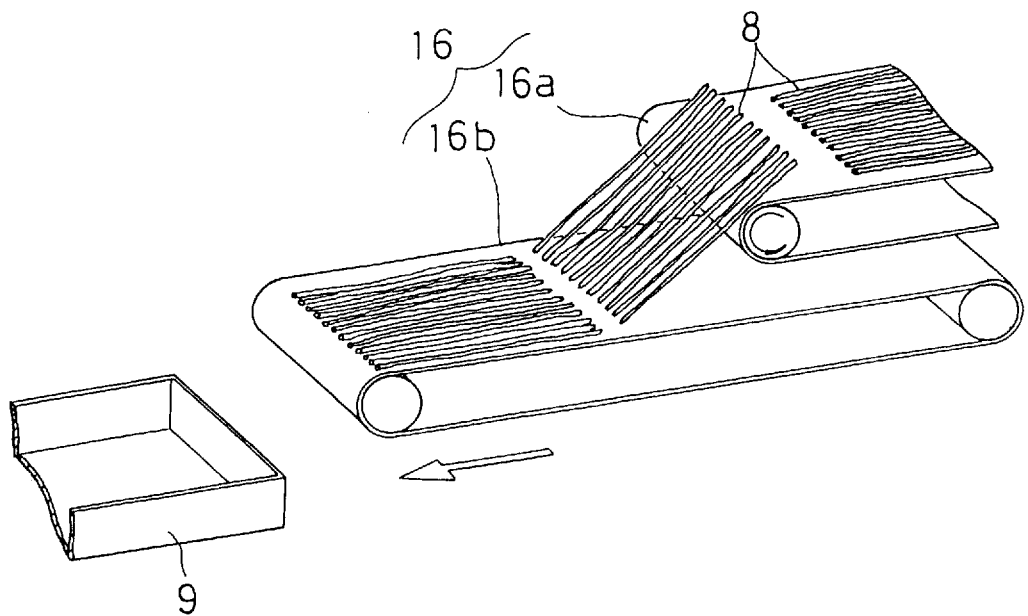
FIG. 9 is a perspective view showing an operation at a time when a forming conveyor of a first means advances.
Figure 10:
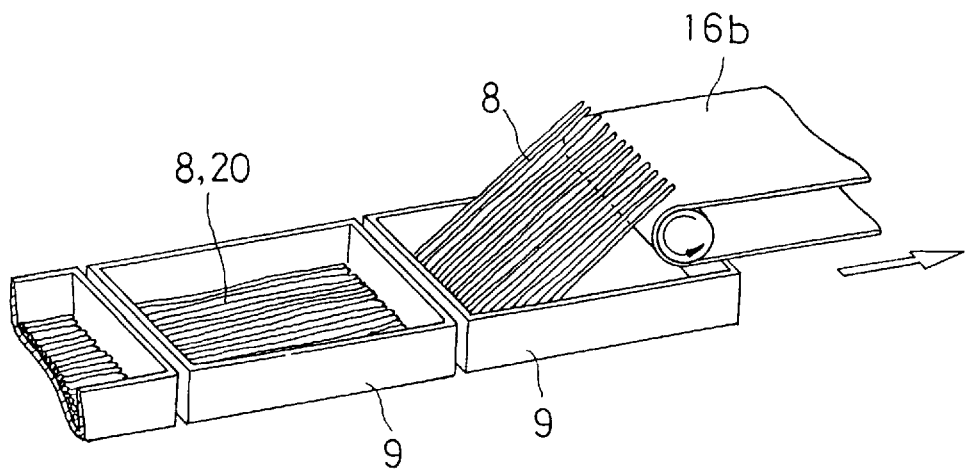
FIG. 10 is a perspective view showing an operation at a time when the forming conveyor of the first means retreats.

FIG. 9 and FIG. 10 are views showing an essential part of the first means 16 and its operation. In the drawings, a reference numeral symbol 16a is a forming conveyor for transferring each finely split piece 8 to a fiber direction by arranging to the fiber direction, a numeral 16b is a swing conveyor which receives each finely split piece from aforesaid forming conveyor 16a and transfers to the molding frame 9 whereby forming a single layer within the molding frame 9. The swing conveyor 16b is provided so as to be able to advance and retreat against the molding frame 9. In FIG. 9, the swing conveyor 16b advances toward the molding frame 9 with receiving each finely split piece 8 from the forming conveyor 16a. At this moment, a belt of the swing conveyor is in a state of rotation stop.

The swing conveyor 16b stops an advance when it is reached a predetermined position on the molding frame 9. Successively, as shown in FIG. 10, it retreats from the molding frame 9 in response to the rotation of belt of the swing conveyor 16b. A single layer 20 according to the finely split piece 8 is formed to the molding frame 9 by such an operation. When the single layer 20 is formed, the mortar is spread on the single layer 20 from the mortar feeding means 19.

Figure 11:
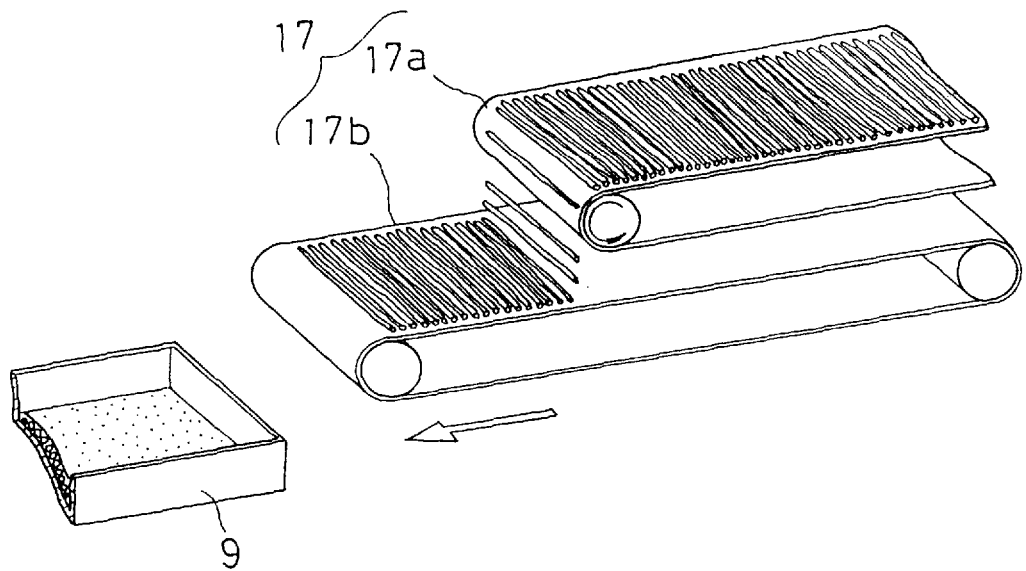
FIG. 11 is a perspective view showing an operation at a time that the forming conveyor of a second means advances.
Figure 12:
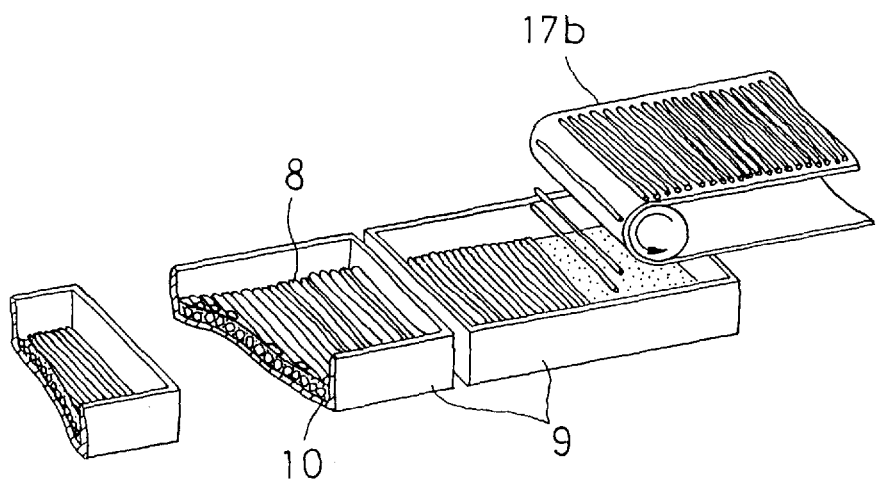
FIG. 12 is a perspective view showing an operation at a time that the forming conveyor of the second means retreats.

FIG. 11 and FIG. 12 are views showing an essential portion of the second means and its operation, and its explanation will be omitted because it is same as aforesaid first means. By the second means, it is possible to form the single layer 20 of structure different from the first means. FIG. 11 and FIG. 12 show the case of forming a single layer 20 in which a fiber direction of the finely split piece 8 crosses with the single layer 20 according to first means.

Figure 13:
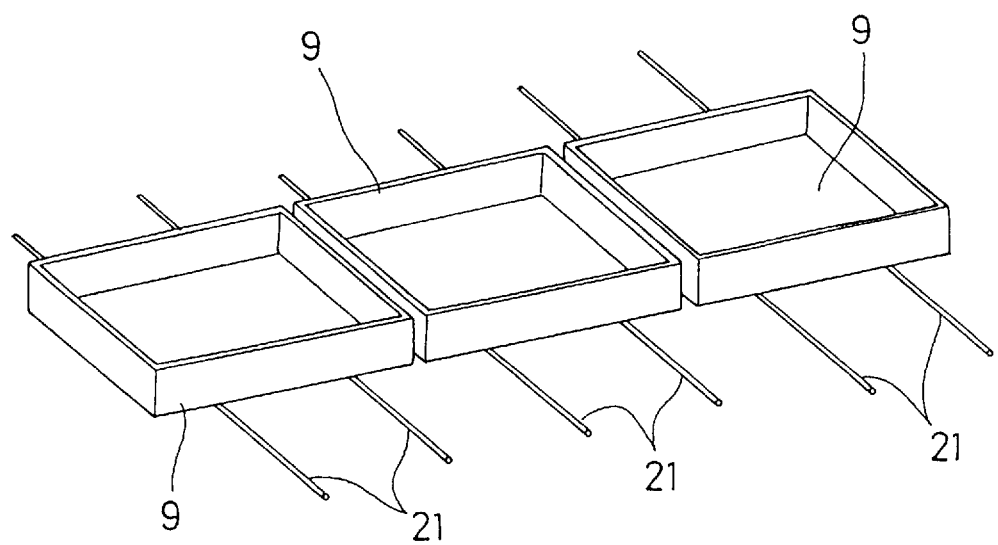
FIG. 13 is a perspective view showing a molding frame and rails as its moving means.

Further, the finely split piece 8 in the second means may be disposed in random without arranging each to a fiber direction. Further, the molding frame 9 is made so as to be able to reciprocate between the first means and the second means by moving on rails 21 as shown in FIG. 13. According to this, single layers 20 of different structure can be alternately piled. The operation of various structure elements of this apparatus is controlled by a general means such as a microcomputer and the like.

What is claimed is:

1. A method of manufacturing woody strand cement board, comprising the steps of:
   (a) cutting woody material selected from the group consisting of wood, bamboo and reed to a predetermined length to obtain cut woody material;
   (b) splitting the cut woody material along a fiber direction;
   (c) finely splitting the woody material from step (b) to obtain finely split pieces;
   (d) spreading in a molding frame the finely split pieces of step (c) as a single layer with gaps between the finely split pieces, and pouring mortar over the single layer;
   (e) repeating step (d) thereby extending the single layer in multiple stages within the molding frame in a piling direction, and covering each finely split piece with mortar, thereby obtaining finely split pieces with mortar filled in the gaps, with the finely split pieces formed in an aggregated state;
   (f) de-airing by vibrating an upper lid plate located on the top surface of the finely split pieces in the aggregated state while closely contacting the finely split pieces and the mortar;
   (g) applying pressure to the upper lid plate and pressing and tightening until the mortar becomes semi-hardened; and
   (h) after pressing and tightening, preserving the mortar until a predetermined state of hardness is achieved.

2. The method of claim 1, wherein:
   each single layer is extended lengthwise of the finely split pieces by joining to another single layer at respective end portions thereof such that the end portions do not superpose each other in said piling direction.

3. A method of manufacturing woody strand cement board, comprising the steps of:
   (a) cutting woody material selected from the group consisting of wood, bamboo and reed to a predetermined length to obtain cut woody material;
   (b) splitting the cut woody material along a fiber direction;
   (c) finely splitting the woody material from step (b) to obtain finely split pieces;
   (d) spreading in a molding frame the finely split pieces of step (c) as a single layer with gaps between the finely split pieces, and spreading water over the single layer;
   (e) spreading a mixture of cement and sand over the single layer which is spread with water;
   (f) repeating steps (d) and (e) thereby extending the single layer in multiple stages within the molding frame in a piling direction, and covering each finely split piece by a mixture of cement and sand, thereby obtaining finely split pieces with cement and sand filled in the gaps, with the finely split pieces formed in an aggregated state;
   (g) de-airing by vibrating an upper lid plate located on the top surface of the finely split pieces in the aggregated state while closely contacting the finely split pieces and the mixture of cement and sand;
   (h) applying pressure to the upper lid plate and pressing and tightening until the mixture of cement and sand becomes semi-hardened; and
   (i) after pressing and tightening, preserving the mixture of cement and sand until a predetermined state of hardness is achieved.

4. The method of claim 3, wherein:
   each single layer is extended lengthwise of the finely split pieces by joining to another single layer at respective end portions thereof such that the end portions do not superpose each other in said piling direction.

* * * * *